United States Patent [19]

van der Burgt

[11] Patent Number: 4,582,513

[45] Date of Patent: Apr. 15, 1986

[54] CENTRIFUGAL PUMP FOR THE SUPPLY OF FINELY DIVIDED SOLIDS

[75] Inventor: Maarten J. van der Burgt, The Hague, Netherlands

[73] Assignee: Shell Oil Company, Houston, Tex.

[21] Appl. No.: 213,973

[22] Filed: Dec. 8, 1980

[30] Foreign Application Priority Data

Dec. 28, 1979 [NL] Netherlands ................... 7909335

[51] Int. Cl.⁴ .............................................. B01D 45/12
[52] U.S. Cl. .................................................. 55/1; 55/406
[58] Field of Search ................ 406/109, 136, 108; 55/328, 406, 408, 409; 233/27; 415/90, 121 A

[56] References Cited

U.S. PATENT DOCUMENTS

| 2,360,464 | 10/1944 | Arveson . | |
| 2,835,537 | 5/1958 | Davis, Jr. . | |
| 3,150,944 | 9/1964 | Nerad | 55/409 |
| 3,408,796 | 11/1968 | Murray | 55/403 |
| 4,034,870 | 7/1977 | Duch . | |

FOREIGN PATENT DOCUMENTS 45-36470  11/1966  Japan .................................. 233/27

*Primary Examiner*—Robert E. Garrett
*Assistant Examiner*—Joseph M. Pitko

[57] ABSTRACT

The application relates to a centrifugal pump for the supply of finely divided solids to a pressurized vessel, which pump has a hollow rotor rotatably arranged in the vessel and a supply tube for the supply of the solids in a carrier gas, which tube is axially connected to the rotor.

6 Claims, 1 Drawing Figure

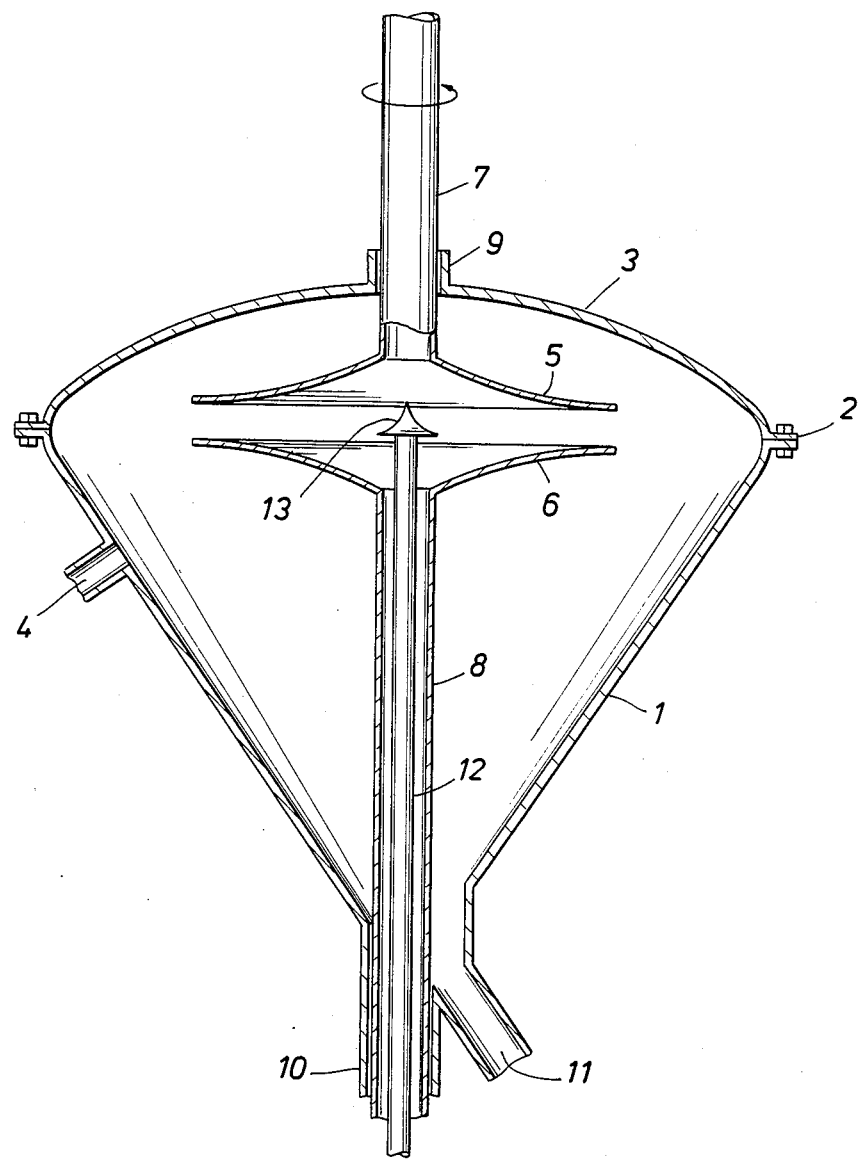

CENTRIFUGAL PUMP FOR THE SUPPLY OF FINELY DIVIDED SOLIDS

BACKGROUND OF THE INVENTION

A centrifugal pump pertinent to the pump of the present invention is shown in U.S. Pat. No. 4,034,870. These centrifugal pumps are used to supply powders or granular materials, for example reactants or catalysts, to a space in which a pressure prevails which is higher than the external pressure. These pumps may of course also be used in situations where there is no pressure difference.

During operation of these pumps the solids are ejected through the supply tube into the rotating rotor. As a result of the centrifugal acceleration the solid particles acquire a high velocity which enables them to overcome the pressure difference between the inside and outside of the vessel and to prevent leakage of gas from the pressurized vessel.

In some centrifugal pumps the rotor is provided with a number of radial passages termed centrifugal nozzles. In other models the solids may be hurled from the entire circumference of the rotor through a narrow slit which is confined by the edges of the two trays which together form the rotor. In that case it is also possible to allow the two discs to rotate with different velocities in order to prevent clogging of the slit.

The solid particles leave the rotor edge with a radial and a tangential velocity component. In the usual embodiments the rotor has a rotational speed of, for example, 500–5000 revolutions per minute and the particles acquire a radial velocity of approximately 10 m/s. In this way pressure differences of some tens of bars, for example, 20–40 bar may be overcome.

The pneumatic supply of finely divided solids from outside the vessel to the rotor is effected through a supply tube which, if desired, also forms the shaft or the axle of the rotor. The carrier gas which is generally at atmospheric pressure cannot be completely hurled into the vessel together with solids because the solid particles are so compressed at the edge of the rotor that little space is left between them. Were there to be a great deal of space, the gas would flow back from the pressurized vessel. Yet the carrier gas has to be withdrawn somehow from the rotor. To this end, use has so far been made of a discharge tube which is coaxially arranged within or around the supply tube. This discharge tube discharged the carrier gas countercurrently with the supply.

From the design point of view this was and is not a happy solution, particularly not if the diameters of the supply and discharge tube have to be increased in order to augment the throughput capacity. The diameters of the tubes may then become too large for low-friction bearings to be used. In addition, the bearing arrangement of two concentric tubes poses a problem in itself, as does the sealing against the high pressure prevailing in the vessel, the shielding of the bearings against solid particles and the fastening to the vessel wall or the rotor.

DESCRIPTION OF THE DRAWING

The FIGURE depicts a diagrammatic axial cross section of a vessel in accordance with the invention.

SUMMARY OF THE INVENTION

The above-described drawbacks have now been overcome in that a discharge tube for the carrier gas is connected to the other side of the rotor in line with the supply tube.

The invention therefore relates to a centrifugal pump for the supply of finely divided solids to a pressurized vessel, having a rotor which is rotatably arranged in the vessel and a supply tube for the supply of the solids into a carrier gas, which tube is axially connected to the rotor, wherein a discharge tube for the carrier gas is connected to the other side of the rotor in line with the supply tube.

DESCRIPTION OF PREFERRED EMBODIMENT

As already stated, an advantage of the centrifugal pump according to the invention is that the throughput capacity of the supply tube may be augmented while maintaining low-friction bearings, such as ball bearings and roller bearings. By not using concentric tubes the bearing arrangement, the shielding and the sealing also become simpler, notably in the preferred embodiments discussed below.

The supply tube is preferably rigidly connected to the rotor. As a result this tube rotates with the rotor and may drive the latter by connecting it to a motor outside the vessel. No sealing and bearing arrangement are then necessary between the rotor and the supply tube. This makes the design simpler while the risk is smaller that the bearings become contaminated by dust particles.

It is also preferred that the discharge tube is rigidly connected to the rotor. Here, too, a bearing arrangement and sealing are no longer required between the rotor and the discharge tube.

As stated above, the finely divided solids are axially supplied to the rotor in a carrier gas, the carrier gas being subsequently discharged in the same direction according to the invention. In order to prevent too much solids from passing straight through, in other words, from not being ejected into the vessel by the rotor, the mixture of gas and solids flowing out of the supply tube is preferably slightly deflected in a radial direction. This may be effected by means of an elbow or a tee, although it is advantageous to use a distributor that rotates symmetrically and which is centrally arranged in the rotor between the discharge and the supply tube. The distributor may have the shape as described in the applicant's earlier Netherlands patent application No. 7908315.

As soon as the gas and solids mixture has been radially deflected, it passes into the rapidly rotating rotor and the peripheral velocity increases. As a result of the difference in density, the solid particles are hurled much more rapidly to the rotor edge, however, than the carrier gas, where the centrifugal nozzles or the slit will soon be completely filled. Only one way out remains for the carrier gas, viz. the axial discharge tube in line with the supply tube.

If desired, the discharged carrier gas may be recirculated and reused as supply carrier gas. It is also possible to vent the discharged carrier gas into the atmosphere. Although the said gas is practically free of solid dust particles, it may be advisable to filter it first.

The discharge may also be annularly shaped, for example as an annular channel around a central shaft, bar or rod. The word "annular" not only includes circular, but also cornered shapes. The distributor may then be secured at one extremity of said rod. By making the rod movable in its longitudinal direction, the distributor may act as a metering device for the quantity of solids to be passed through, while it may in an emergency optionally shut off the supply tube.

The application will now be further elucidated with reference to the FIGURE which depicts a diagrammatic axial cross section of a vessel comprising a funnel-shaped casing 1 and a cover 3 secured onto it by means of a flange 2. The interior of the vessel may be filled with compressed inert gas via a gas inlet 4. A rotor is mounted in the vessel, which rotor consists of two coaxial trays or discs 5 and 6 of which the concave sides face each other. The supply tube 7 for carrier gas and solids is integral with the tray 5 and is supported at 9 by a bearing in the cover 3 and may be driven by means not shown. The discharge tube 8 for carrier gas is integral with tray 6 and is supported at 10 by a bearing in the funnel-shaped casing 1 and may also be driven. The vessel is also provided with a passage 11 for the discharge of solids to another space, for example a reactor. A rod 12 is centrally arranged in the discharge tube 8, which rod is provided at its upper extremity with a distributor 13. The rod 12 can be moved axially.

The application particularly relates to a process for the gasification of coal particles in a gasification reactor, the coal particles being supplied to the gasification reactor with the aid of a centrifugal pump according to the invention.

In this embodiment the centrifugal pump is arranged in a space in which the same pressure prevails as in the reactor. This pressure is approximately 30 bar. The coal particles are transported from this space with the aid of suitable means, such as a worm screw, to the gasification reactor.

By coal particles are meant particles of all solid carbon-containing fuels such as hard coal, brown coal, lignite, coke and hard bitumen granules.

What is claimed is:

1. A centrifugal pump for feeding finely divided solids transported by a carrier gas into a pressurized vessel and separating the carrier gas, comprising:
   a centrifugal pump rotor which is rotatably arranged in the vessel, said rotor having two concaved discs, said discs being mounted coaxially in opposed positions with their concave surfaces directed away from each other, both of said discs having central openings:
   a supply tube for the supply of the solids and a carrier gas, said supply tube being connected to the central opening in one of said discs; and
   a discharge tube for the carrier gas, said discharge tube being connected to the central opening in the other of said discs.

2. The centrifugal pump as claimed in claim 1, characterized in that the supply tube is rigidly secured to the central opening in said one disc.

3. The centrifugal pump as claimed in claim 1, characterized in that the discharge tube is rigidly connected to the central opening in said other disc.

4. The centrifugal pump as claimed in claim 1, characterized in that a distributor is arranged centrally in the rotor between the central openings in said two discs.

5. A process for suppyling finely divided particles to a pressurized vessel comprising rotating a rotor within the vessel, passing the particles and carrier gas through a supply tube which is axially connected to one side of the rotor, removing the carrier gas through a discharge tube connected to the other side of the rotor in line with the supply tube, deflecting the particles outwardly into the surrounding interior of the vessel with a distributor centrally arranged within the rotor between the supply tube and the discharge tube.

6. The process of claim 5 wherein the particles are coal particles.

* * * * *